(12) United States Patent
Taniguchi et al.

(10) Patent No.: US 7,157,709 B2
(45) Date of Patent: Jan. 2, 2007

(54) INFRARED SENSOR PACKAGE (75) Inventors: Ryo Taniguchi, Tsu (JP); Yuji Takada, Kyoto (JP); Masahiro Kodoh, Agei-gun (JP); Masato Shinotani, Tsu (JP); Hisanobu Tanaka, Kameyama (JP); Atsushi Hironaka, Shijonawate (JP)

(73) Assignee: Matsushita Electric Works, Ltd., Osaka (JP)

( * ) Notice: Subject to any disclaimer, the term of this patent is extended or adjusted under 35 U.S.C. 154(b) by 253 days.

(21) Appl. No.: 10/484,406

(22) PCT Filed: Jun. 24, 2003

(86) PCT No.: PCT/JP03/07988

§ 371 (c)(1),
(2), (4) Date: May 11, 2004

(87) PCT Pub. No.: WO04/001908

PCT Pub. Date: Dec. 31, 2003

(65) Prior Publication Data

US 2004/0178344 A1    Sep. 16, 2004

(30) Foreign Application Priority Data

Jun. 25, 2002  (JP)  ............................. 2002-184639
Sep. 26, 2002  (JP)  ............................. 2002-281811

(51) Int. Cl.
    *G01J 5/34*    (2006.01)
(52) U.S. Cl. ................................. 250/338.3
(58) Field of Classification Search ............ 250/338.3, 250/338.01, 338.4
    See application file for complete search history.

(56) References Cited

U.S. PATENT DOCUMENTS

| 4,266,239 | A |   | 5/1981 | Miyagaki et al. |
| 4,937,649 | A | * | 6/1990 | Shiba et al. ................. 257/207 |
| 5,962,854 | A | * | 10/1999 | Endo ........................... 250/349 |
| 6,121,614 | A |   | 9/2000 | Taniguchi et al. |
| 6,209,399 | B1 |  | 4/2001 | Probst et al. |
| 2001/0020681 | A1 | * | 9/2001 | Yagyu et al. ............. 250/338.3 |

FOREIGN PATENT DOCUMENTS

| EP | 0 959 538 A2 | 11/1999 |
| EP | 0 959 538 A3 | 11/1999 |
| JP | 08-015007 A1 | 1/1996 |

OTHER PUBLICATIONS

International Search Report for PCT/JP03/07988 mailed on Oct. 29, 2003.

* cited by examiner

*Primary Examiner*—Otilia Gabor
(74) *Attorney, Agent, or Firm*—Rader, Fishman & Grauer PLLC (57) ABSTRACT

An infrared sensor package has a dielectric support which is molded from a plastic material to have a sensor mount for securing a pyroelectric element as well as an IC mount for securing an IC chip that processes a signal from the pyroelectric element. The support is molded over to be integral with metal parts. The metal parts include sensor conductors for interconnection of the pyroelectric element with the IC chip, and I/O conductors for interconnection of the IC chip with I/O pins. The sensor conductors as well as the I/O conductors are both molded into and integrally with the dielectric support.

6 Claims, 14 Drawing Sheets

INFRARED SENSOR PACKAGE

TECHNICAL FIELD

The present invention is directed to an infrared sensor package, and more particularly to an infrared sensor package of a self-contained type incorporating a pyroelectric element as well as an IC chip which processes a signal output from the element for providing a determined sensor output.

BACKGROUND ART

U.S. Pat. No. 6,121,614 discloses an infrared sensor of the above self-contained type having a dielectric support on which the pyroelectric element as well as the IC chips are mounted. The support is held within a space between a base and a cover. The base has I/O pins that are connected to the IC chip and projects for connection with an external circuit. In order to electrically connect the IC chip to the pyroelectric element, external electric parts, and the I/O pins, the support of generally cuboid configuration is formed with a complex conductor pattern extending across two or more outer surfaces of the support. However, the conductor pattern can be only realized through several processes with the use of specific facilities, which makes it difficult to make the sensor at a low cost.

DISCLOSURE OF THE INVENTION

In view of the above problem the present invention has been achieved to provide an improved infrared sensor package which is capable of being manufactured at a reduced cost, yet retaining compactness. The infrared sensor package of the present invention includes a dielectric support which is molded from a plastic material to have a sensor mount for securing a pyroelectric element as well as an IC mount for securing an IC chip that processes a signal from the pyroelectric element. The support is held on a base which is formed with a plurality of I/O pins extending through the base for electrical connection of the IC chip with an external circuit. A cover is secured to the base to give a space therebetween for accommodating the support. The support is formed with sensor conductors for electrical interconnection between the pyroelectric element and the IC chip and also with I/O conductors for electrical interconnection between the IC chip and the I/O pins. The important feature of the present invention resides in that the sensor conductors and the I/O conductors are molded into and integrally with the dielectric support. Thus, the sensor conductors as well as the I/O conductors can be realized by a rather simple manufacturing process to thereby reduce a cost of manufacturing the infrared sensor, while assuring the electrical connections on the side of the support between the IC chip and the pyroelectric element and between the IC chip and the I/O pins.

In a preferred embodiment, the support is shaped into a generally cuboid having an upper face, a front face and a lower face. The upper face is formed with the sensor mount, while the front face is formed with the IC mount. Each of the sensor conductors has portions exposed on the upper and front faces of the support respectively for connection with the pyroelectric element secured to the sensor mount as well as for connection with the IC chip secured to the IC mount. Each I/O conductor has portions exposed on the front and lower faces of the support respectively for connection with the IC chip and with the I/O pin on the lower face of the support. With this arrangement, the sensor package can be made compact, while simplifying the patterns of the individual conductors.

Preferably, a metal-shield is molded into the support in a portion adjacent to the IC mount and connected to a stabilized electric potential in the circuit of the IC chip for shielding the IC chip at the stabilized electric potential, thereby electromagnetically protecting the circuit of the IC chip to minimize parasitic capacitance between the input and output of the IC chip for enhanced reliability of the sensor output. In this connection, the metal-shield may be shaped to have a vertical segment embedded in the support behind the IC mount and a horizontal segment bent from the upper end of the vertical segment for shielding the IC chip from the pyroelectric element. This is advantageous for effectively shielding the IC chip also from the pyroelectric element, yet with the use of the metal shield embedded in the support.

The metal-shield may be shaped to have a major portion embedded behind the IC mount in the front face and a terminal leg extending from the major portion to the front face of the support for connection with a constant potential portion of the circuit of the IC chip.

Further, the metal-shield is preferred to have an integral extension which extends behind the sensor mount for shielding the pyroelectric element as well.

In the preferred embodiment, one of the sensor conductors, which is responsible for connection with a signal output of the pyroelectric sensor, is located adjacent to the upper face and is spaced diagonally with respect to the front face from one of the I/O conductors which is connected to an output of the IC chip. This is advantageous for reducing a possible capacitive coupling between the signal input and the output of the IC chip for reliable infrared detection.

Further, the I/O conductor may include a vertical segment embedded within the support and a horizontal segment extending from the lower end of the vertical segment outwardly of the support for immediate connection with the I/O pin It is also preferred that the support is molded over a first metal-shield and a second metal-shield which are spaced from each other adjacent to the IC mount for shielding the IC chip. The first metal-shield is electrically connected to a ground line of the IC chip, while the second metal-shield is electrically connected to a portion of the IC chip having an electrical potential higher than the ground line. With the inclusion of the second metal-shield, it is readily possible to reduce a leakage current from the sensor output of the pyroelectric element, thereby improving reliability of the infrared sensor.

The sensor conductors may be respectively formed with pads that project on the support for electrical connection with electrodes of the pyroelectric element by means of electrically conductive adhesives.

The support is formed with a concavity for receiving therein an external electric component to be connected to the circuit of the IC chip. A pair of component terminals is molded into the support with portions thereof exposed to a bottom of the concavity for contact with the external electric component and for electrical interconnection of the component to the IC chip. Thus, the necessary electronic component external to the IC chip can be successfully incorporated into the support together with the IC chip, making the whole assembly compact. In this connection, the component terminals have their respective portions exposed to a bottom of the concavity receiving the IC chip for electrical interconnection of the external electric component to the IC chip.

In another embodiment of the present invention, the support is configured as a generally flat plate having a top face and a bottom face which are formed respectively with the sensor mount and the IC mount. In this case, each sensor conductor has portions exposed on the top and bottom faces of the support for interconnection between the pyroelectric element and the IC chip, while each I/O conductor has portions exposed on the bottom face of the support for interconnection between the IC chip and the I/O pins. Thus, the pyroelectric element, the IC chip and the I/O pins can be successfully supported on the flat support and electrically connected to each other with the use of the conductors embedded in the support.

In this case, the sensor conductor and the I/O conductors can be shaped into flat plates embedded in the support between the sensor mount and the IC mount. With the use of the flat-shaped sensor conductors and the I/O conductors, it is possible to make the electrical interconnection without relying upon extra bending works on the embedded conductors, therefore reducing the manufacturing cost.

Further, the sensor mount and the IC mount may be recesses respectively formed in the top and bottom faces for accommodating therein the pyroelectric element and the IC chip.

Each of the I/O pins may be formed integrally with each associated one of the I/O conductors. That is, the I/O conductor molded in the support may be provided integrally with the I/O pin for reducing a number of components.

The sensor conductors have pads exposed to the sensor mount for supporting the pyroelectric element in the form of a plate. That is, the pyroelectric element may bridge across the pads to be electrically connected as well as mechanically supported thereto. This bridge support ensures sufficient thermal isolation of the pyroelectric element from the support or the IC chip for reliable sensing performance. Preferably, the sensor mount is in the form of a concavity formed in the support to expose the pads on the bottom of the concavity.

When the IC mount is in the form of a recess, the recess is shaped to have a bottom and a mouth which is greater than the bottom. This is advantageous for facilitating to make wire bonding between the IC chip and the sensor conductors and/or the I/O terminals, i.e., accommodating the entry of a capillary head used in the wire bonding.

Further, the support may be formed with holes for receiving therein the respective I/O pins. Each I/O conductor has a portion exposed in each hole for electrical interconnection with the I/O pin inserted into the hole.

These and still other objects and advantageous features of the present invention will become more apparent from the following description of the preferred embodiments when taken in conjunction with the attached drawings.

MODE FOR CARRYING OUT THE INVENTION

Figure 1:
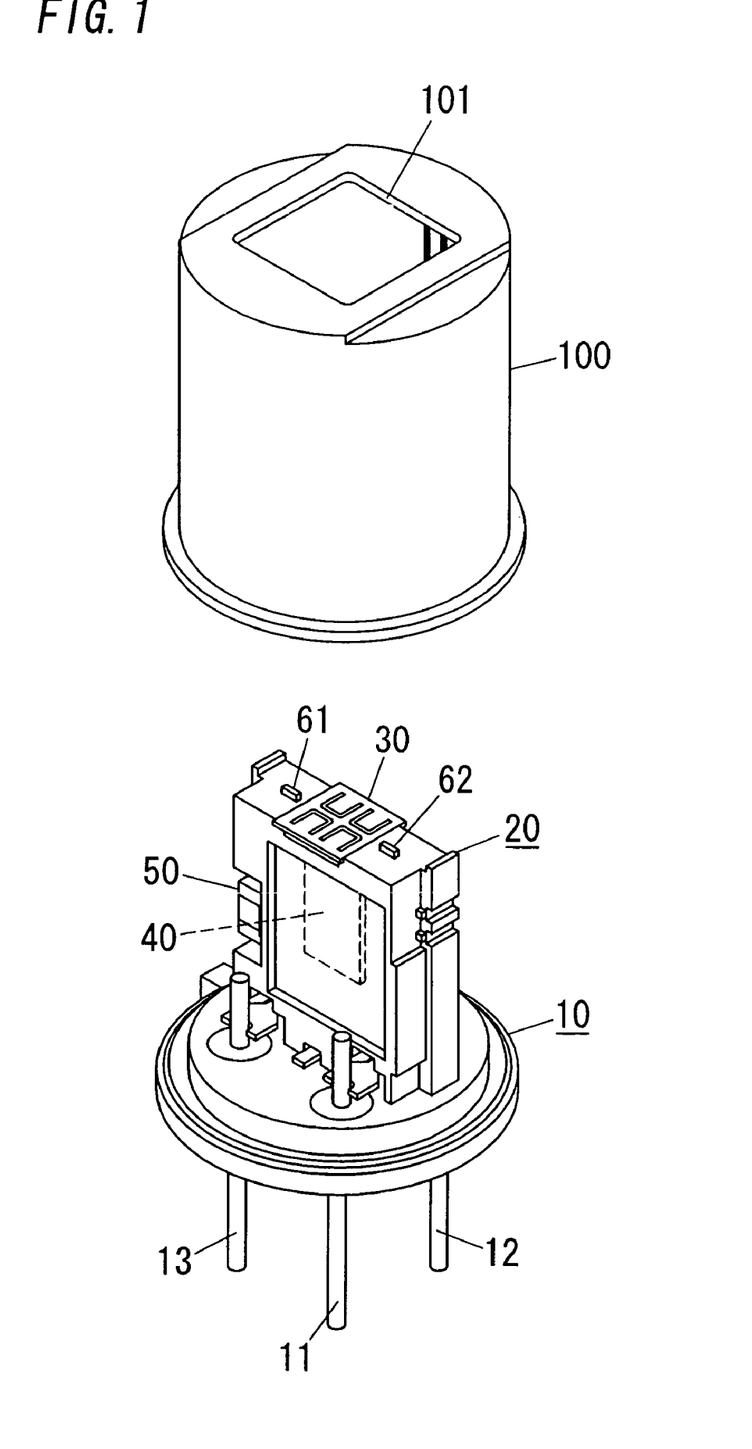
FIG. 1 is an exploded perspective view of an infrared sensor package in accordance with a preferred embodiment of the present invention.
Figure 10:
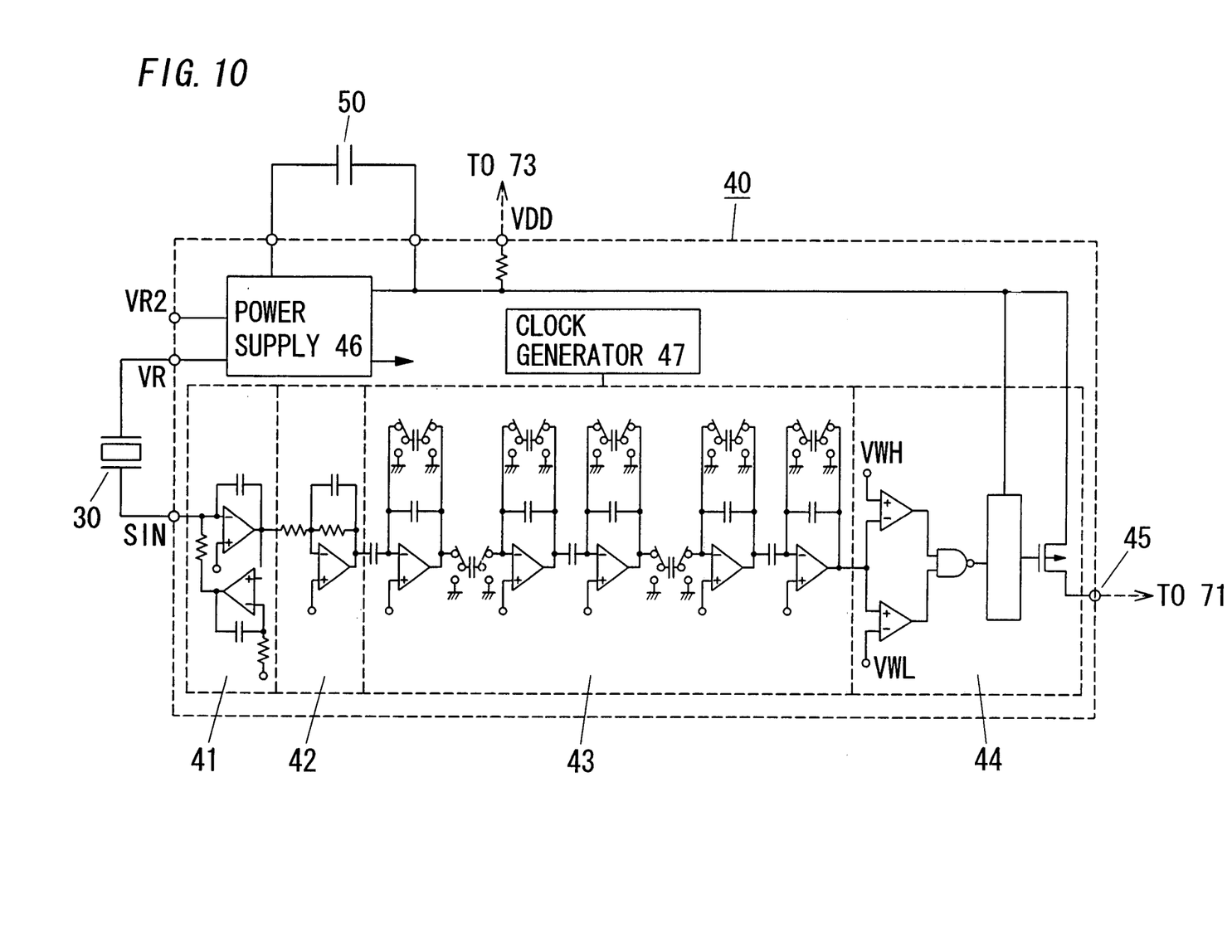
FIG. 10 is a circuit diagram of the sensor package.

Referring now to FIG. 1, there is shown an infrared sensor package in accordance with a preferred embodiment of the present invention. The infrared sensor package is provided, for example, to detect human presence in the room or area in order to give a warning or control an associated lighting device or the like. The package is basically composed of a base 10 carrying a dielectric support 20, I/O terminal pins 11 to 13, and a cover 100 fitted over the support 20 on the base 10. The dielectric support 20 retains a pyroelectric element 30, an IC chip 40 forming a signal processing circuit, and an electronic component 50 to be connected to the circuit of the IC chip 40. The pyroelectric element 30 generates a signal output upon receiving infrared radiation through a transparent window 101 in the top of the cover 100. As shown in FIG. 10, the signal processing circuit realizes a current-voltage converter 41 for converting the signal output in the form of a current into a voltage, an amplifier 42 for amplifying the voltage, a digital filter 43 for filtering off noises not originating from other than the human, and an output section 44 including a window-comparator that compares the filtered voltage with thresholds for detection of the human presence, and outputs a determined sensor output indicative of the human presence through an output terminal 45. In addition, the circuit includes a power supply 46 which is energized by an external source voltage <VDD> to supply an operating voltage <VR> to the pyroelectric element 30 as well as other voltages to various portions of the circuit, and also includes a clock generator 47 that gives a clock signal to the digital filter 43. The external electronic component 50 is a capacitor of relatively large capacitance which is not included in the IC chip 40 and is connected to the circuit thereof.

Figure 2:
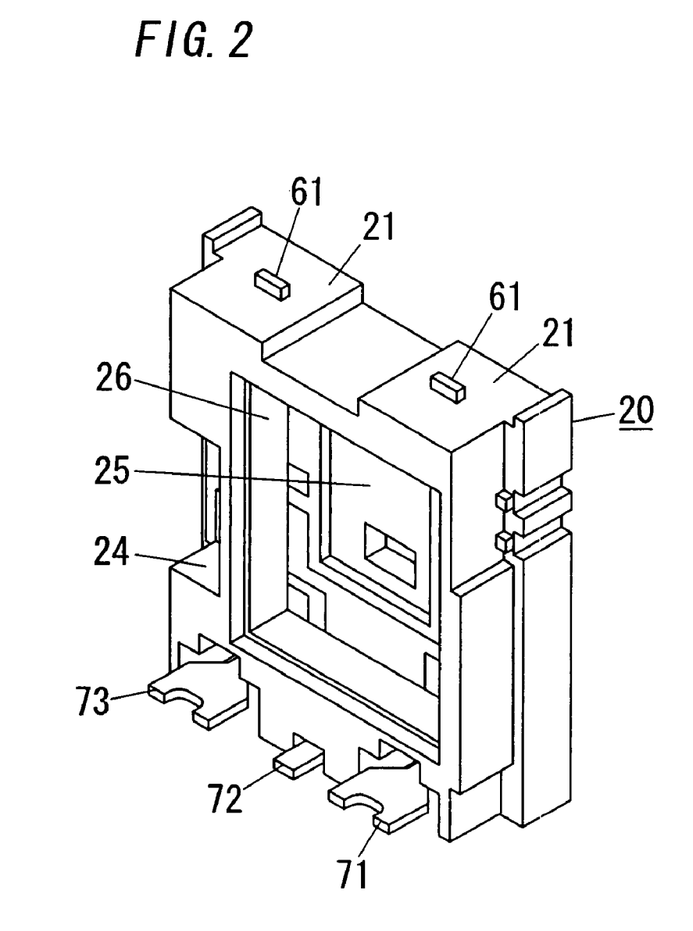
FIGS. 2 and 3 are perspective views of a major portion of the sensor package respectively viewed from different directions.
Figure 3:
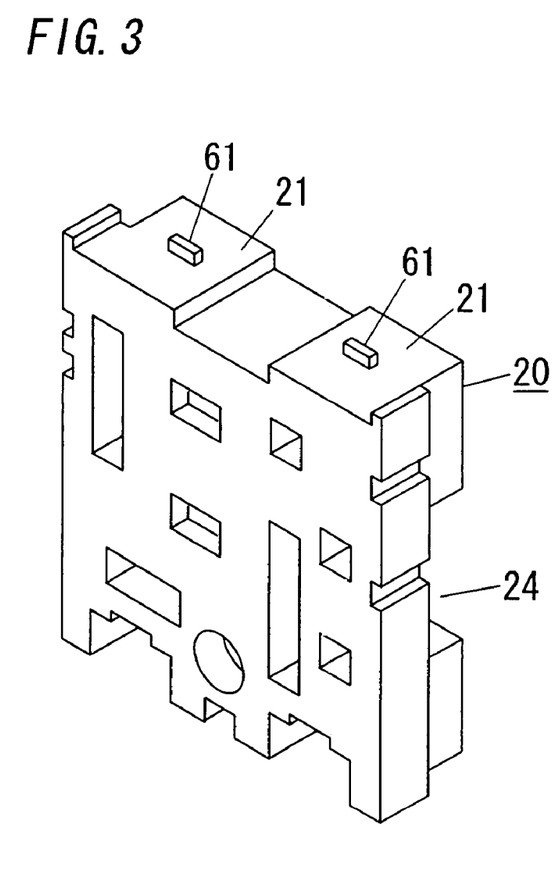
Figure 4:
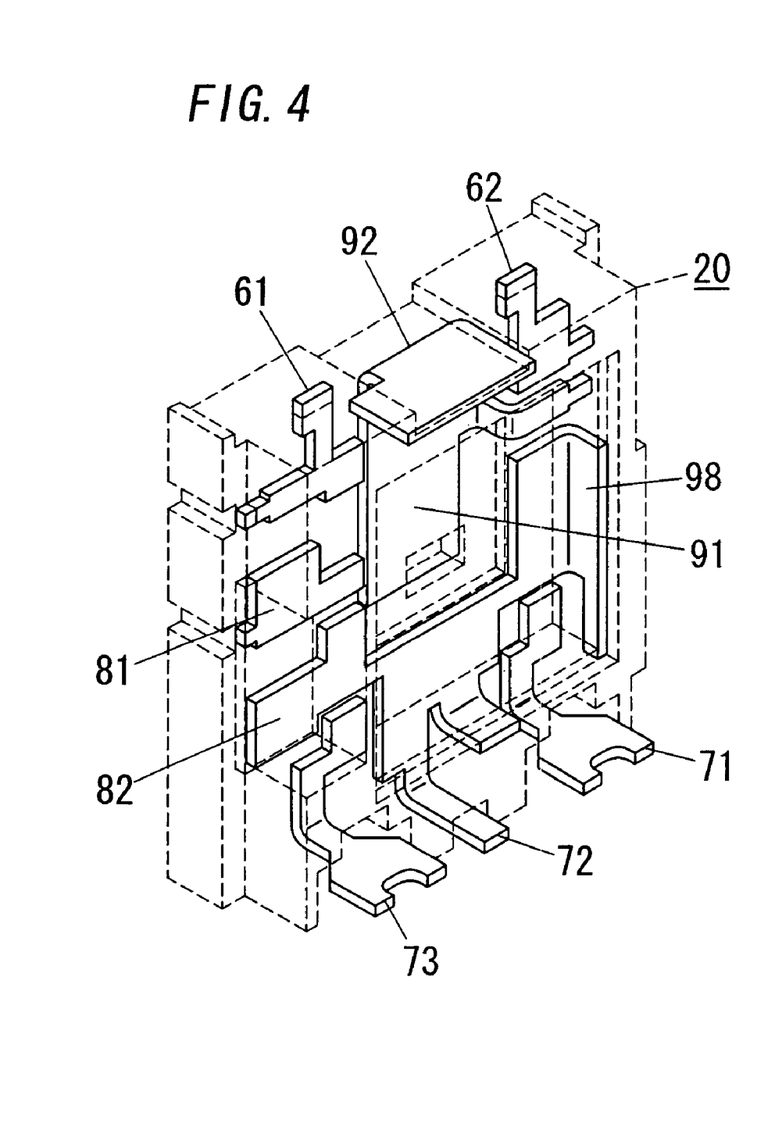
FIG. 4 is a perspective view illustrating an internal structure of the package.
Figure 5:
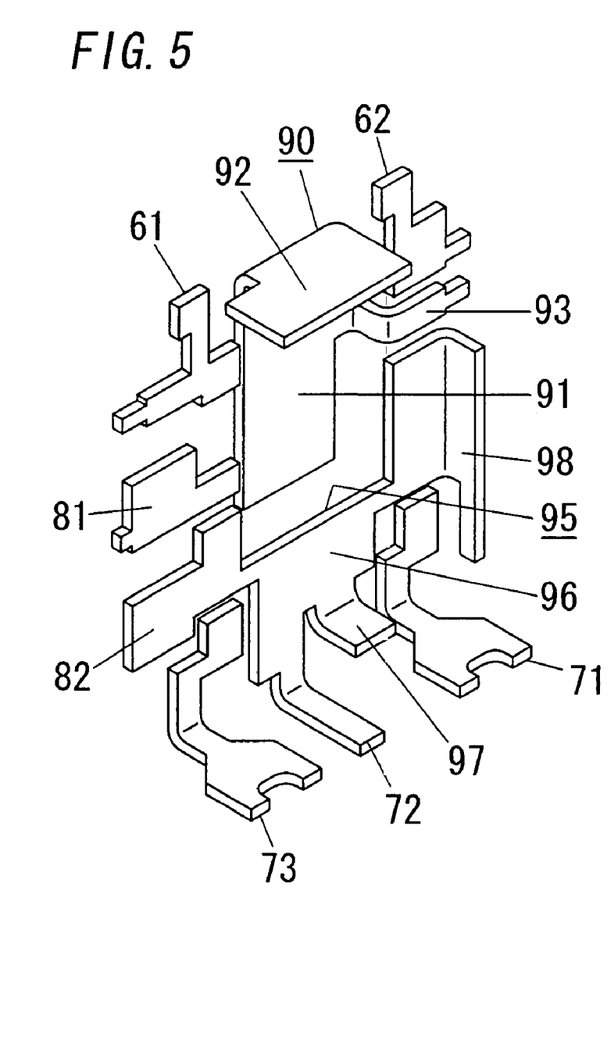
FIG. 5 is a perspective view of metal conductors embedded in a plastic support of the package.
Figure 6:
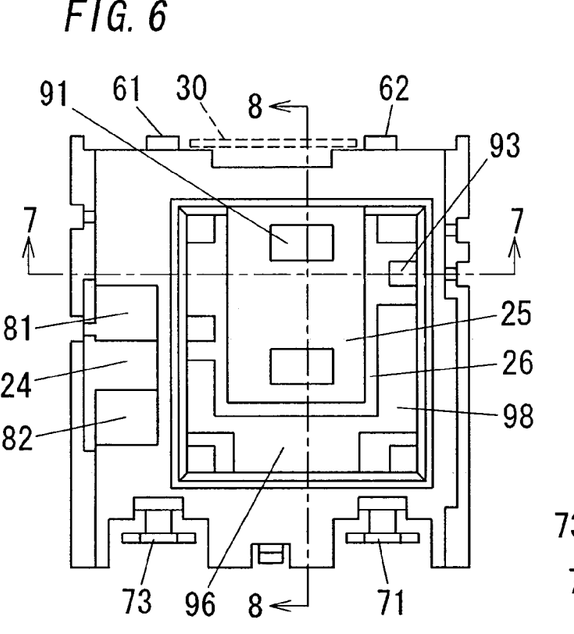
FIG. 6 is a front view of the support.

As shown in FIGS. 2 and 3, the support 20 is molded from a dielectric plastic material into a generally flat cuboid having a narrow top face and a large front face. The top face is formed with a sensor mount 21 for securing the pyroelectric element 30, while the front face is formed with an IC mount 25 for securing the IC chip 40. The plastic support 20 is made from a liquid crystal polymer, and is molded over metal parts to be integral therewith. That is, the metal parts are embedded partly in the support 20 at the molding thereof. As shown in FIGS. 4 and 5, the metal parts include a pair of sensor conductors 61 and 62 for electrically interconnecting the pyroelectric element 30 with the IC chip 40, three I/O conductors 71 to 73 for electrically interconnecting the IC chip 40 respectively with the I/O pins 11 to 13, a pair of component terminals 81 and 82 for electrical interconnection of the external component 50 with the IC chip 40, and shield plates 90 and 95. The shield plate 90 is separated from the other metal parts, and includes a vertical segment 91, a horizontal segment extending from the top of the vertical segment, and a terminal lead 93 extending horizontally from one side of the vertical segment. The vertical segment 91 is embedded in the support 20 at a location behind the upper portion of the IC chip 40 for electromagnetically shielding thereof, while the horizontal segment 92 is embedded in the support at a location below the pyroelectric element 30 for shielding or electromagnetically isolating the IC chip 40 from the pyroelectric element 30. The shield plate 95, on the other hand, is formed as an integral or continuous member with the I/O conductors 72 as well as the component terminal 82, and includes a vertical segment 96 located behind the lower end of the IC chip 40, a horizontal segment 97 projecting from the lower end of the vertical segment 96 for shielding the lower end of the IC chip 40, and a side extension 98 for shielding the side of the IC chip 40. As best shown in FIG. 6, the vertical segment 96 has is major portion exposed on the front face of the support 20 and is connected to a ground of the IC chip 40. In this connection, the I/O conductor 72 integral with the shield plate 95 is exposed on the bottom of the support for direct contact with a ground conductor 14 at the upper end of the base 10 and is electrically connected therethrough to the I/O pin 12.

Figure 9A:
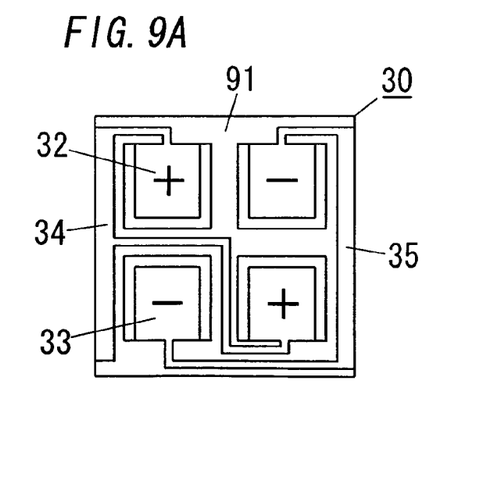
FIGS. 9A and 9B are respectively top and bottom views of a pyroelectric element utilized in the package.
Figure 9B:
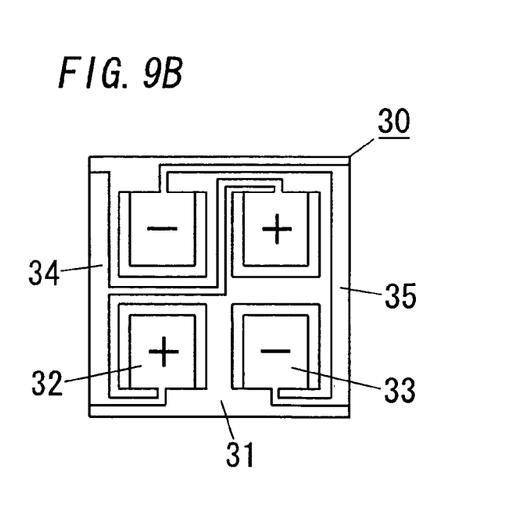

Turning back to FIGS. 2 and 3, the sensor mount 21 is defined by a pair of shoulders at opposite ends of a cavity formed in the upper face of the support 20. It is the shoulders across which the pyroelectric element 30 bridges (FIG. 1) to be secured to the upper face of the support 20. The pyroelectric element 30 is composed of a dielectric substrate 31 formed on opposite surfaces respectively with light receiving electrodes 32 and 33. The electrodes 32 and 33 are arranged on the upper surface of the substrate in a pattern (FIG. 9A) and on the lower surface of the substrate in a pattern (FIG. 9B) such that four pairs of electrodes 32 and 33 of opposite polarities are given with the substrate interposed between the electrodes of each pair. The substrate 30 is formed on its opposed ends with terminals 34 and 35 which are connected respectively by means of an electrically conductive adhesive to pads or the portions of the sensor conductors 61 and 62 projecting on the upper face of the support 20.

Figure 7:
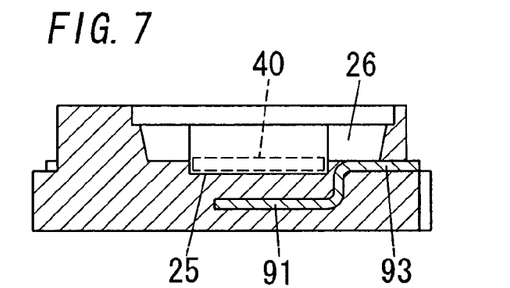
FIG. 7 is a cross-section taken along line 7—7 of FIG. 6.
Figure 8:
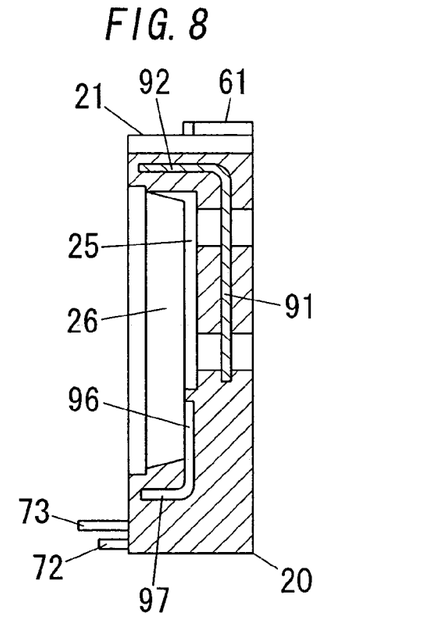
FIG. 8 is a cross-section taken along line 8—8 of FIG. 6.

The IC mount 25 is in the form of a rectangular recess in the bottom of a window 26 in the front face of support 20 for receiving therein the IC chip 40, as indicated by dotted lines in FIGS. 1 and 7. The IC chip 40 is secured by an adhesive to the bottom of the recess 25 and is electrically connected by the wire bonding technique to the portions of the conductors embedded in the support. As best shown in FIGS. 4 and 6, exposed on the bottom of the window 26 around the recess 25 are portions of the sensor conductors 61 and 62, the component terminals 81 and 82, the vertical segment 96, the terminal lead 93, and the I/O conductors 71 and 73. It is these portions that are wire-bonded to corresponding terminal leads on the periphery of the IC chip 40. In this connection, wall surrounding the window 26 are inclined to give an opening or mouth which is wider than the bottom, as shown in FIGS. 7 and 8, thereby facilitating the wire-bonding operations, i.e., easily accommodating a capillary head utilized for the wire-bonding.

The sensor conductor 61 is connected to receive a signal output from the pyroelectric element 30 and is wire-bonded to a signal input <SIN> of the circuit of the IC chip 40, while the circuit gives the sensor output through the output terminal 45 to the I/O conductor 71. As shown in the figures, the signal input, i.e., the connection to the sensor conductor 61 is spaced diagonally, with respect to the front face of the support 20, from the sensor output, i.e., the connection to the I/O conductor 71. This spatial arrangement enhances the electrical isolation between the signal output of the pyroelectric element 30 and the sensor output of the IC chip 40 in cooperation with a unique electromagnetic shielding scheme using two shield plates 90 and 95 of different potentials. That is, the shield plate 95 adjacent to the sensor output to the I/O conductor 71 is connected to a circuit ground of the circuit of the IC chip 40, while the shield plate 90 adjacent to the sensor conductor 61 providing the sensor output is connected at the terminal lead 93 to a portion of the IC chip 40 having a constant potential <VR2> or <VR> raised from the ground, as shown in FIG. 10. The constant potential or stabilized voltage is given as a reference voltage with which the output <SIN> of the pyroelectric element 30 is compared to determine the human presence. Because of that the shield plates 91 and 92 are held at the reference voltage higher than the ground, it is made to minimize a possible current leak from the output of the pyroelectric element to the IC chip, thus assuring reliable detection.

The support 20 is also formed in the front face adjacent to the window 26 with a concavity 24 into which the external component 50 is inserted and is electrically connected by means of the electrically conductive adhesive to the portions of the component terminals 81 and 82 exposed on the bottom of the concavity 24. The I/O conductors 71 and 73 have the respective lower ends bent to give feet which are exposed on the lower end of the support for connection with the I/O pins 11 and 13 on the upper face of the base 10, as shown in FIG. 1.

Figure 11A:
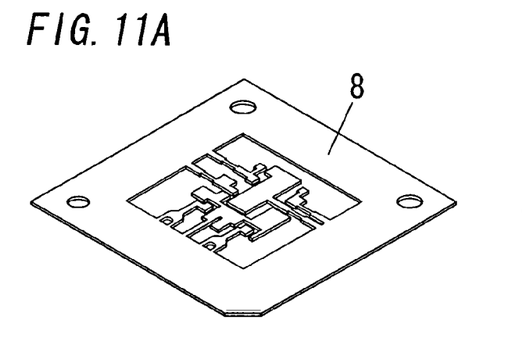
FIGS. 11A to 11F are perspective views illustrating a process of fabricating the sensor package.
Figure 11B:
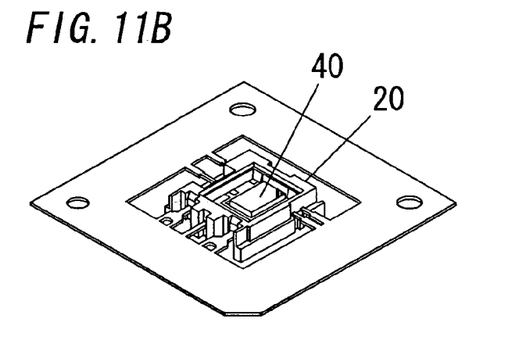
Figure 11C:
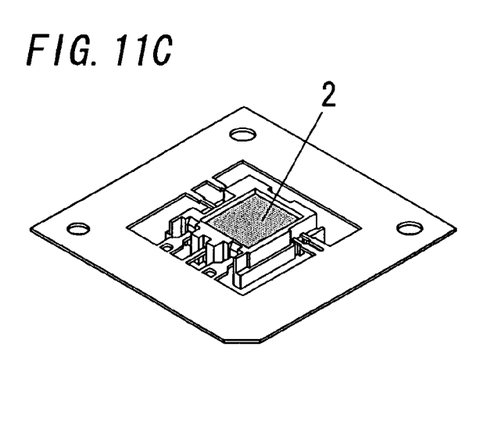
Figure 11D:
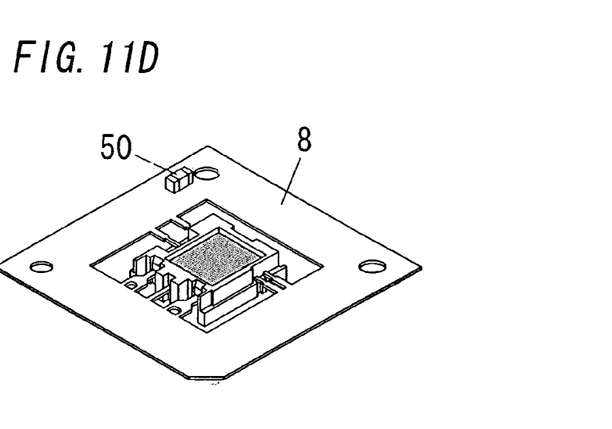
Figure 11E:
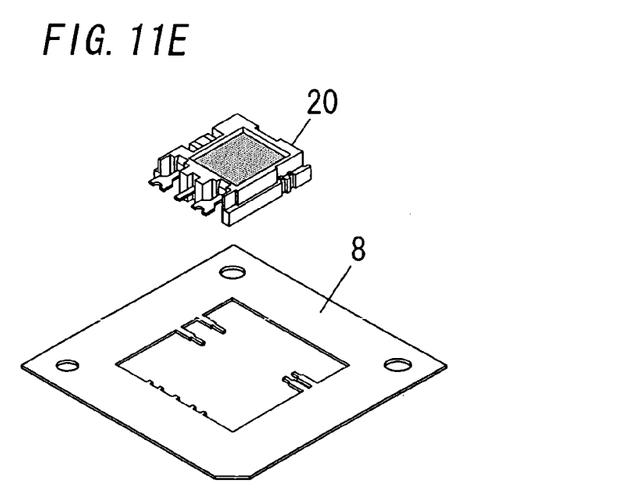
Figure 11F:
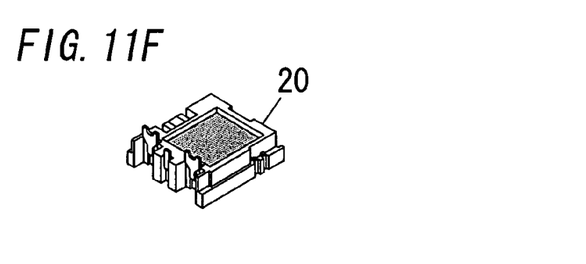
Figure 12A:
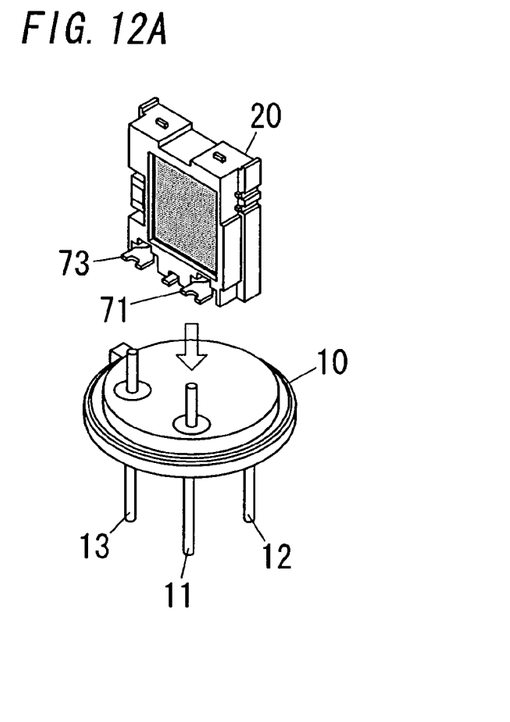
FIGS. 12A to 12D are perspective views illustrating a process of fabricating the sensor package.
Figure 12B:
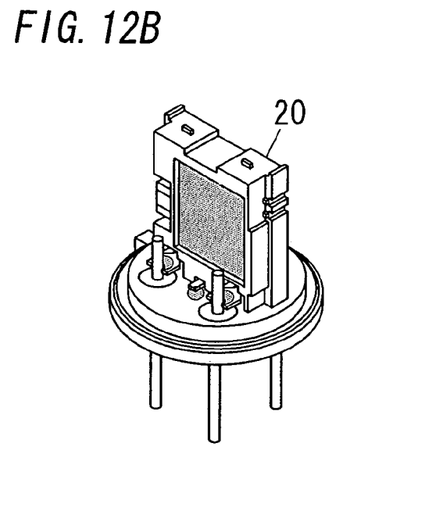
Figure 12C:
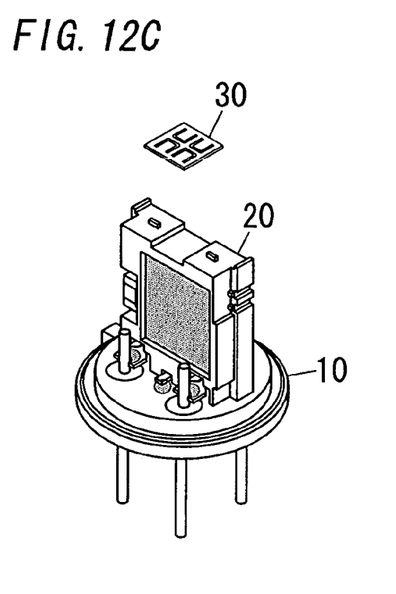
Figure 12D:
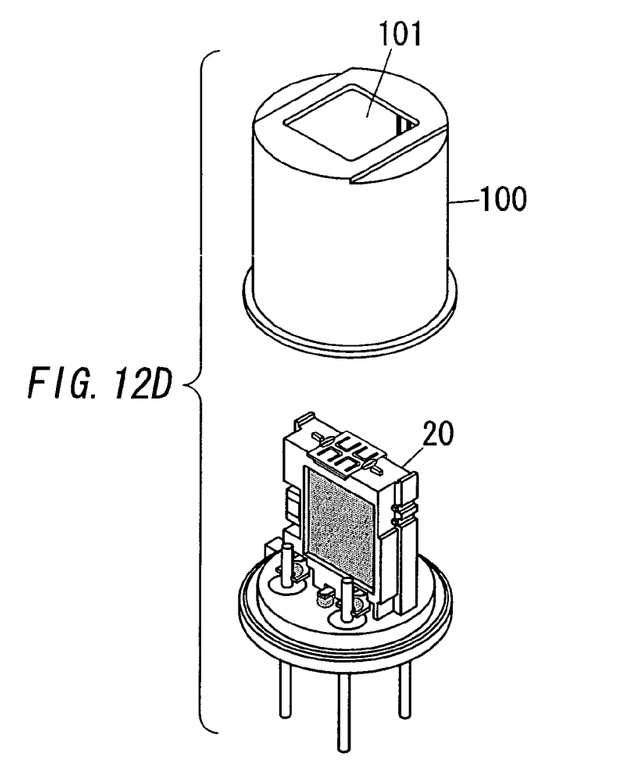

FIGS. 11A to 11F and FIGS. 12A to 12D illustrate steps of fabricating the infrared sensor package. Firstly, the conductors or metal parts are formed in a single metal sheet 8 by being stamped out therefrom (FIG. 11A). Then, the support 20 is molded over the portions of the metal parts and the IC chip 40 is mounted to the support 20 (FIG. 11B), after which the window is filled with an encapsulating composition 2 to seal the IC chip therein (FIG. 11C). Subsequently, the external electronic component 50 is fitted into the concavity 24 (FIG. 11D), and the support 20 is removed from a frame of the metal sheet (FIG. 11E), after which the feet of the I/O conductors 71 and 73 are bent (FIG. 11F). Then, the support 20 is assembled on the base 10 with the I/O conductors 71 to 73 connected to the I/O pins 11 and 13 and the ground conductor 14 of the base (FIGS. 12A and 12B). Finally, the pyroelectric element 30 is secured to the sensor mount 21 on top of the support 20 (FIG. 12C), and the cover 100 is placed over the support and sealed to the base 10 (FIG. 12D).

Figure 13:
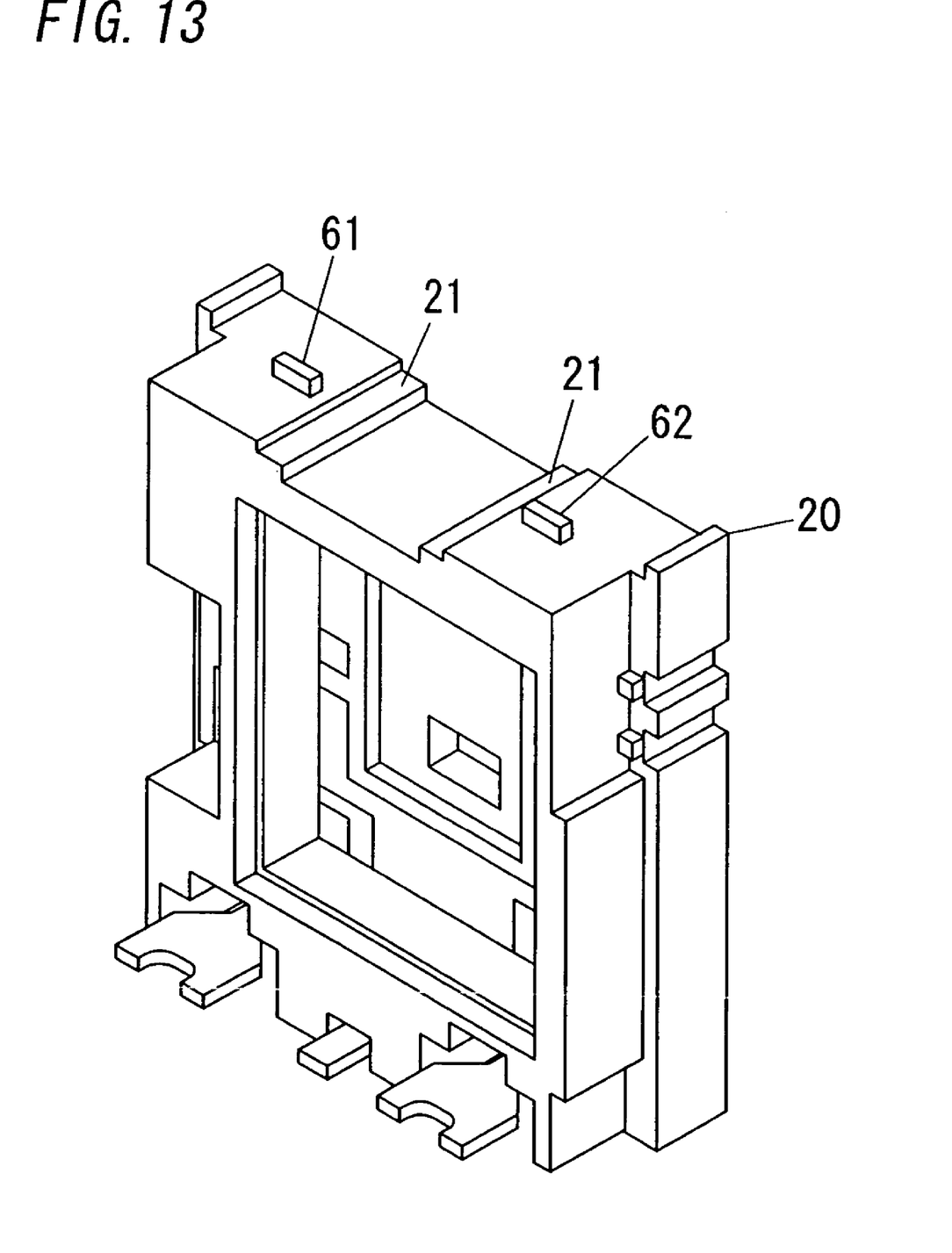
FIG. 13 is a perspective view of a modification of the above sensor package.

FIG. 13 illustrates a modification of the above embodiment in which the sensor mount 21 is defined by a pair of stepped shoulders which are recessed from the top face of the support by a depth corresponding to the thickness of the pyroelectric element for stably receiving the ends of the pyroelectric element in the stepped shoulders of the sensor mount 21.

Figure 14:
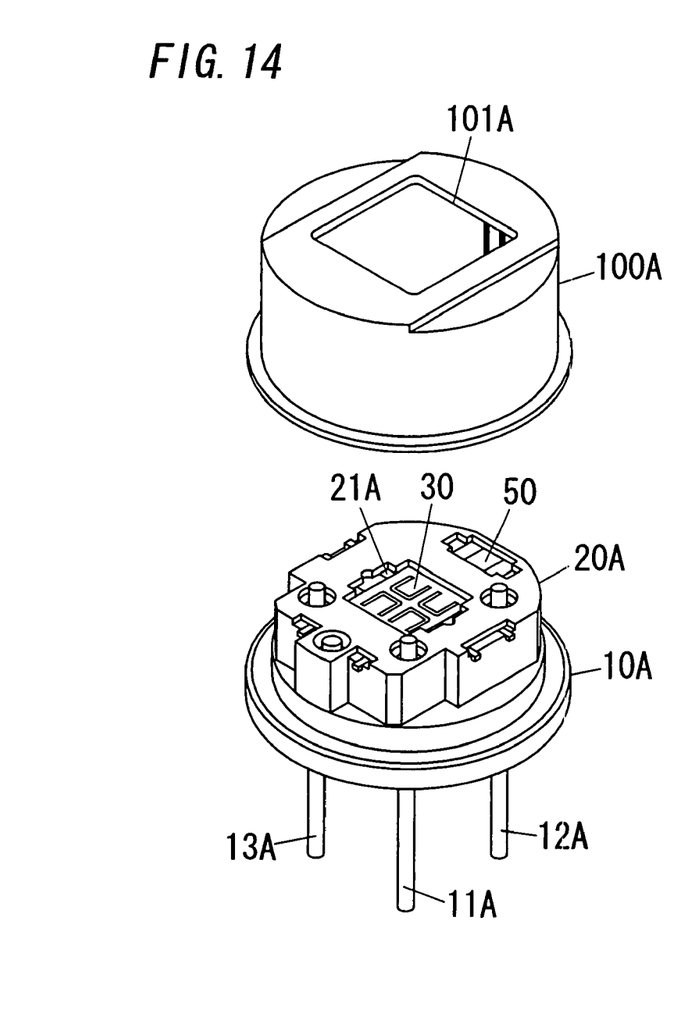
FIGS. 14 and 15 are exploded perspective views of an infrared sensor package in accordance with another embodiment of the present invention.
Figure 15:
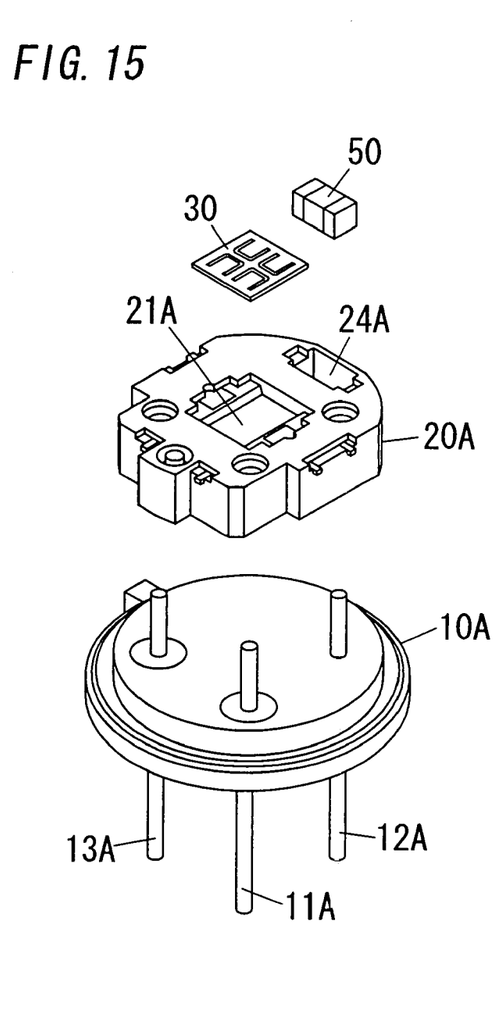

Now referring to FIGS. 14 and 15, there is shown an infrared sensor package in accordance with another preferred embodiment of the present invention which is basically similar to the previous embodiment but is different therefrom specifically in that the support 20A lies flat on the base 10A to realize a low-profile structure. Like parts are designated by like reference numerals with a suffix letter of "A", and no duplicate explanation deemed is made herein.

Figure 16:
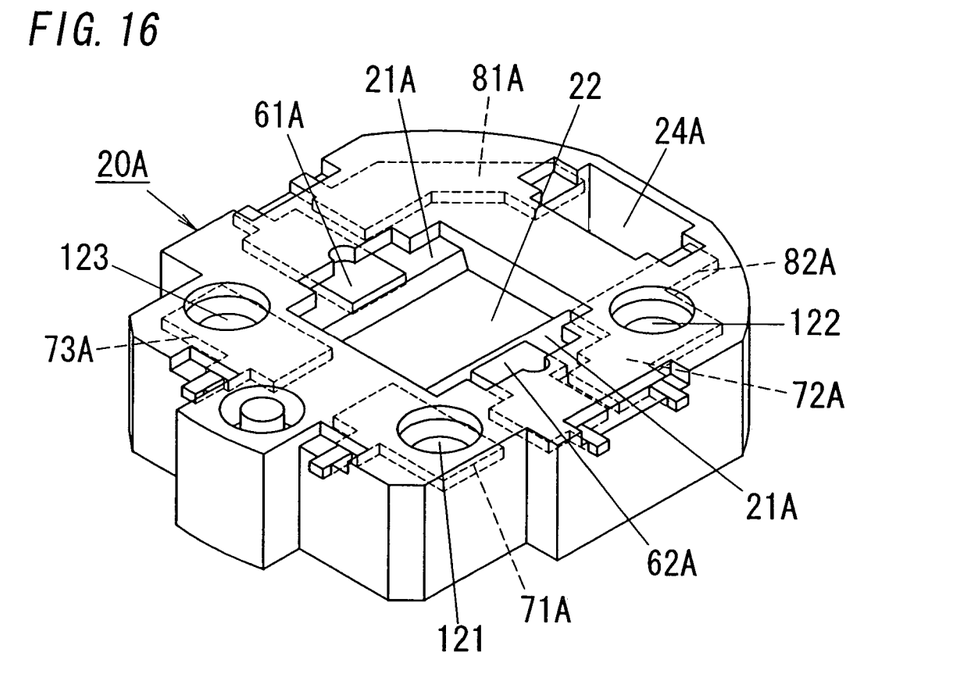
FIGS. 16 and 17 are perspective views illustrating a plastic support of the sensor package respectively viewed from different directions.
Figure 17:
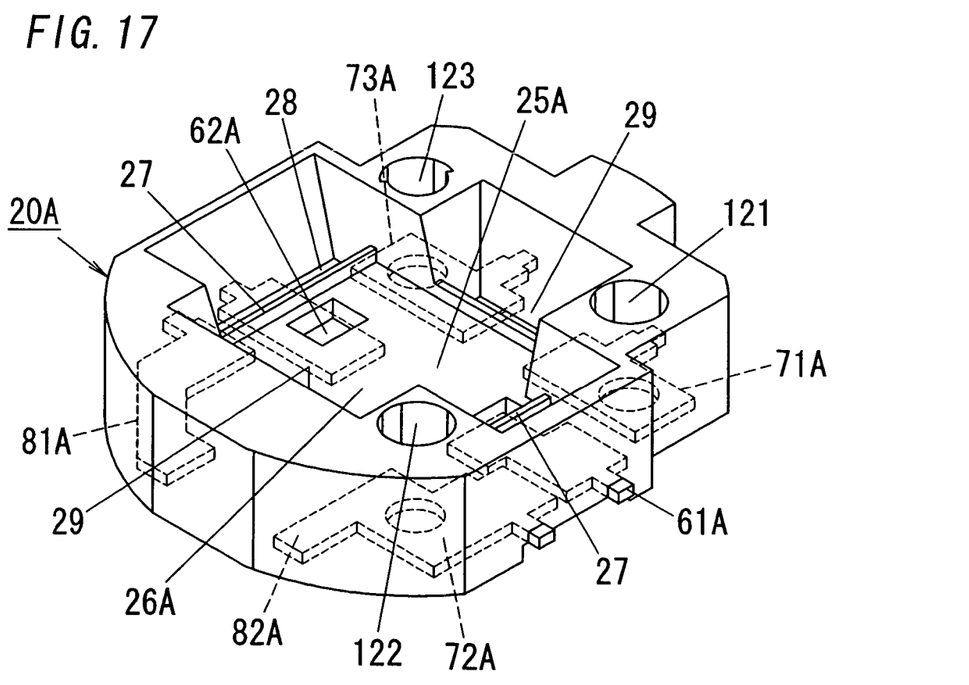

The support 20A is molded over metal parts stamped out from a single metal sheet, and is formed in its upper large surface with a sensor mount 21A in the form of a recess and also with a concavity 24A for the external electronic component 50, and in the lower surface with an IC mount 25A, as shown in FIGS. 16 and 17. The sensor mount 21A is defined by a pair of stepped shoulders which are formed on opposite ends of a depression 22 and are recessed from the upper face of the support 20A. That is, the sensor mount 21A is in the form of a concavity with the depression 22 in its bottom. Sensor conductors 61A and 62A are embedded flat in the support and have the respective portions exposed on the shoulders of the sensor mount 21A to define pads respectively for immediate connection with the terminals of the pyroelectric element 30 held on the shoulders. The IC mount 25A is defined by a recess within a window 26A formed in the lower surface of the support 20A, as shown in FIG. 17. The recess 25A is formed on its width ends respectively with ribs 27 between which the IC chip 40 is fitted. Formed on the bottom of the window 26A at portions outwardly of the ribs 27 are sections 28 where the portions of the sensor conductors 61A and 62A are exposed for connection with the corresponding terminals of the IC chip 40 by the wire bonding.

The support 20A include I/O conductors 71A, 72A, and 73A as well as component terminals 81A and 82A all of which are basically flat plates partly embedded within the support at the molding thereof. These members have their portions exposed on the bottom of the window 26A around the recess 25A for connection with the associated terminals of the IC chip 40 by the wire bonding. For this purpose, the window 26A is also formed on the longitudinal ends of the bottom with sections 29 in which portions of the I/O conductors 71A, 72A and 73A are exposed. The component terminals 81A and 82A are also made flat and have its respective portions exposed on the bottom of the concavity 24A for connection with the component 50 by the conductive adhesive. As shown in FIG. 17, the interior wall of the windows adjacent to the sections 28 and 29 are inclined to give an opening or mouth which is wider than the bottom for facilitating the wire-bonding operations.

As indicated by dotted lines in FIGS. 16 and 17, the component terminal 82A is integral with the I/O conductor 72A in the like manner as in the previous embodiment. Although not illustrated in the figures, a metal shield or shields for the IC chip and/or the pyroelectric element may be embedded in the support in the like manner as in the previous embodiment. Each of the I/O conductors 71A to 73A has a ring which is exposed in the wall of each one of the holes 121 to 123 for electrical contact with each associated one of the I/O pins extending through the holes.

Figure 18A:
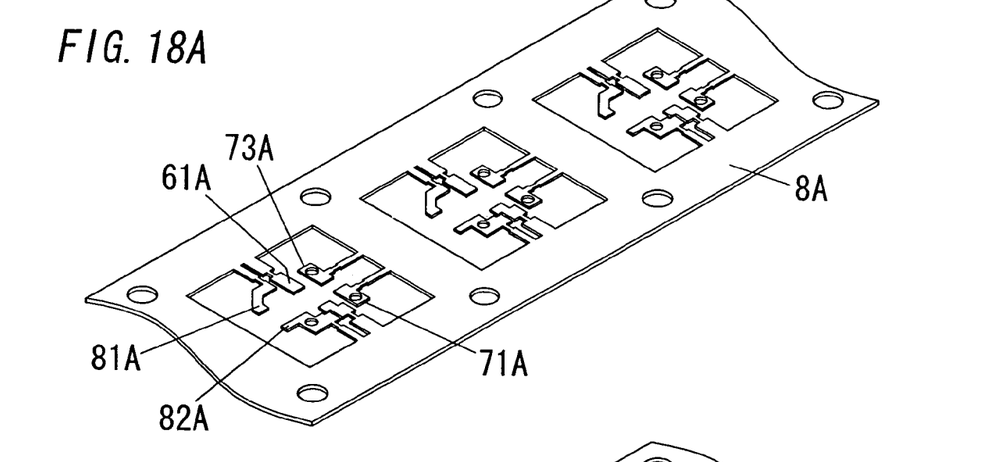
FIGS. 18A to 18E are perspective views illustrating a process of fabricating the sensor package.
Figure 18B:
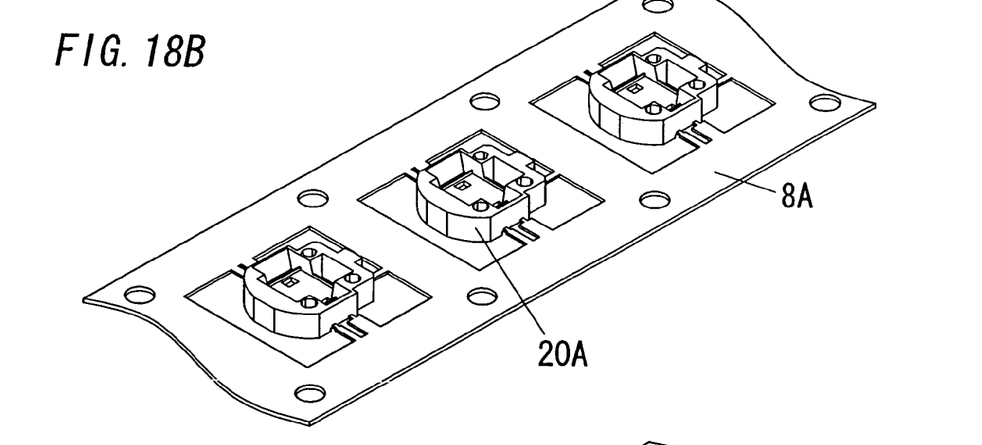
Figure 18C:
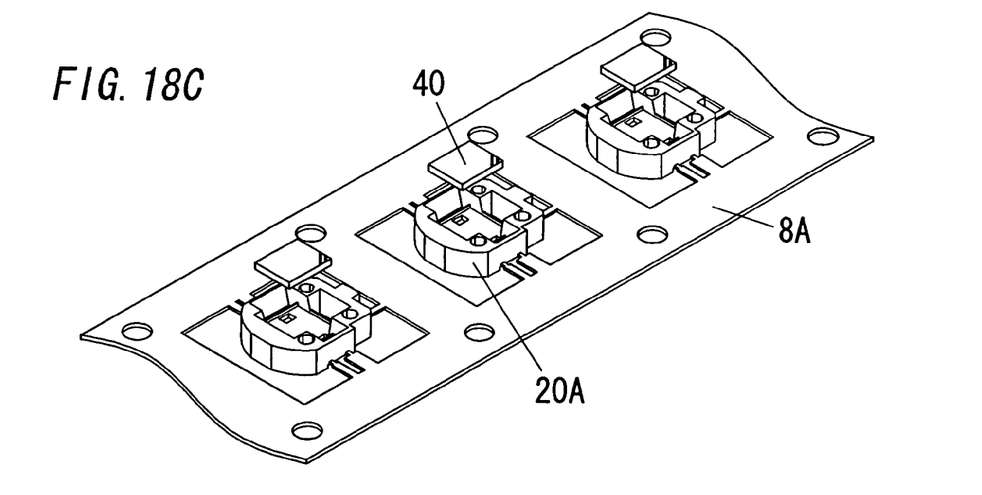
Figure 18D:
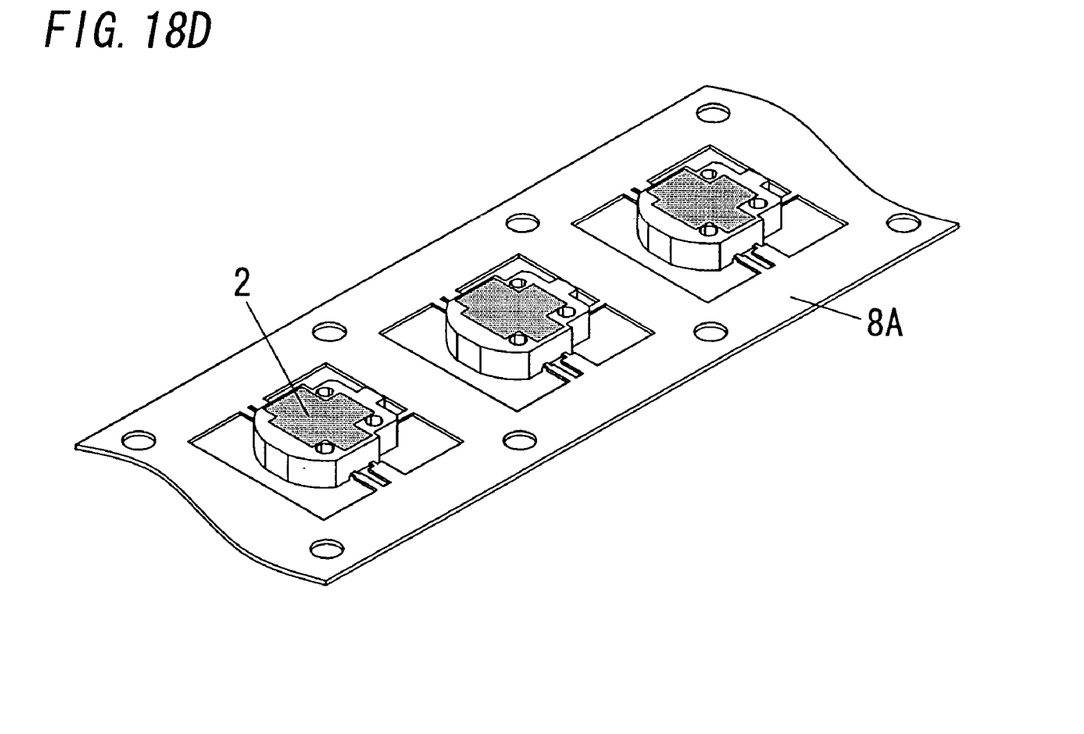
Figure 18E:
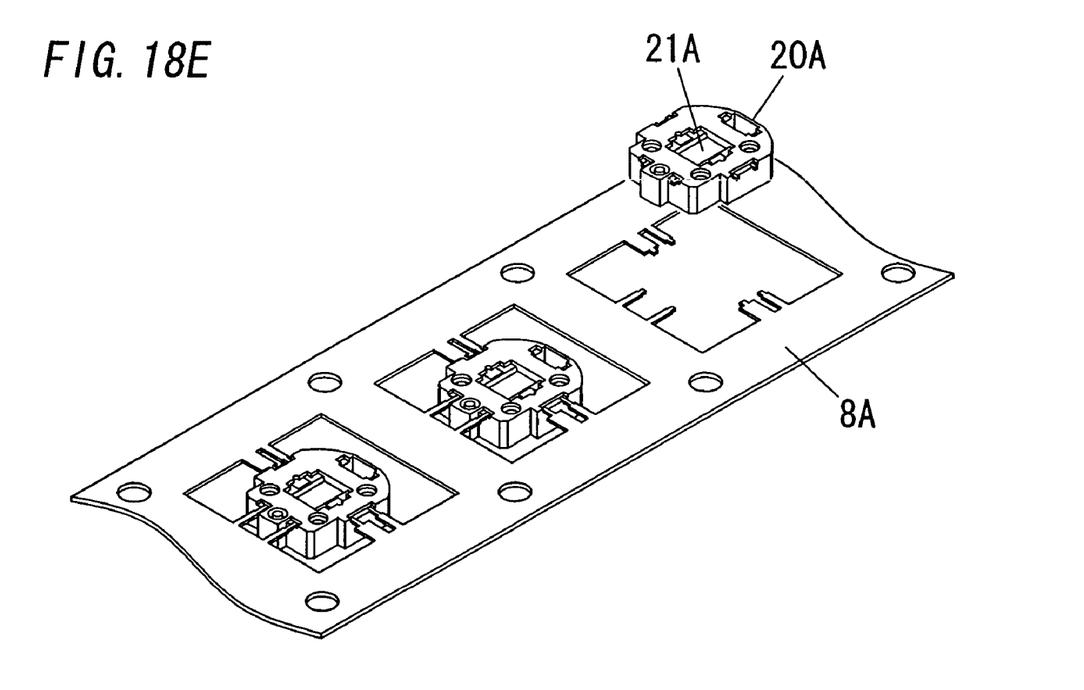

FIGS. 18A to 18E illustrate steps of fabricating the sensor package. A single metal sheet 8A or tape is formed with the metal parts for plural sets the packages (FIG. 18A). After the support 20A is molded over the metal parts of each set (FIG. 18B), the IC chip 40 is mounted on the support 20A followed by being connected to the embedded I/O conductors (FIG. 18C). Then, the IC chip is sealed by the encapsulating composition 2A (FIG. 18D), after which the support 20A is removed from the metal sheet (FIG. 18E). Finally, the pyroelectric element 30A as well as the electric component 50A are secured to the support 20A, and the support 20A is secured on the base 10A, as shown in FIG. 15.

Figure 19:
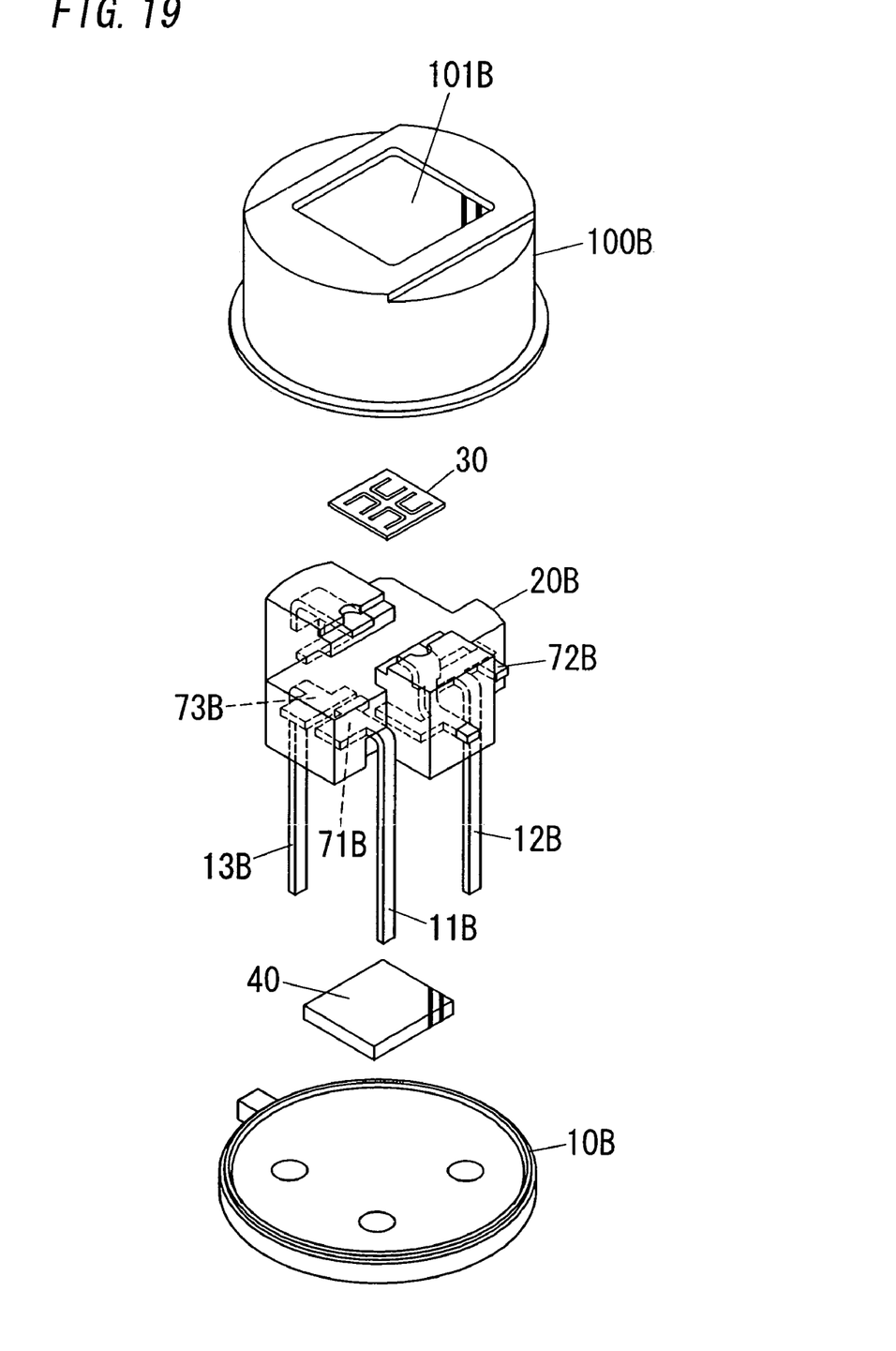
FIG. 19 is a perspective view of a modification of the above embodiment.
Figure 20:
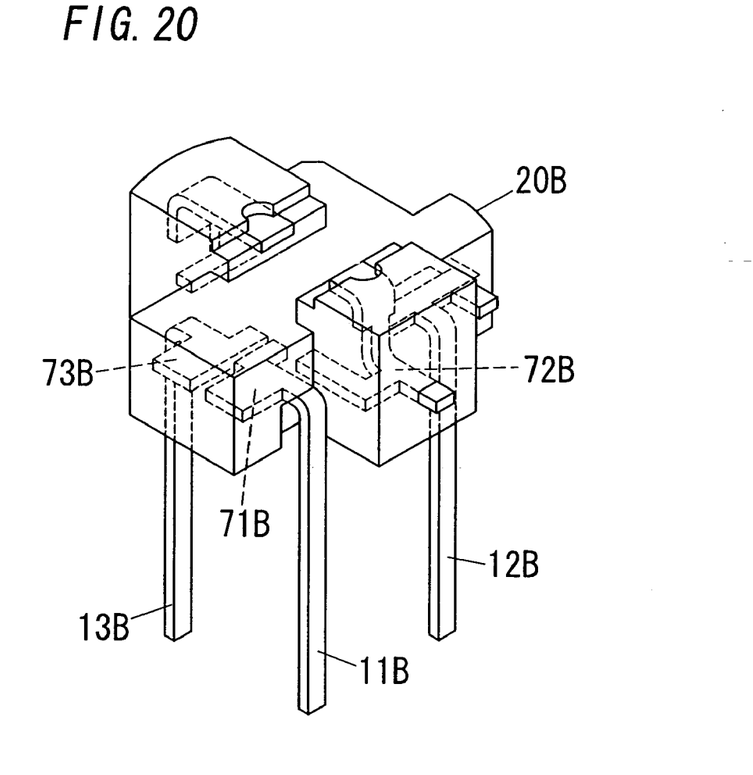
FIGS. 20 and 21 are perspective views illustrating the support respectively as viewed from different directions.
Figure 21:
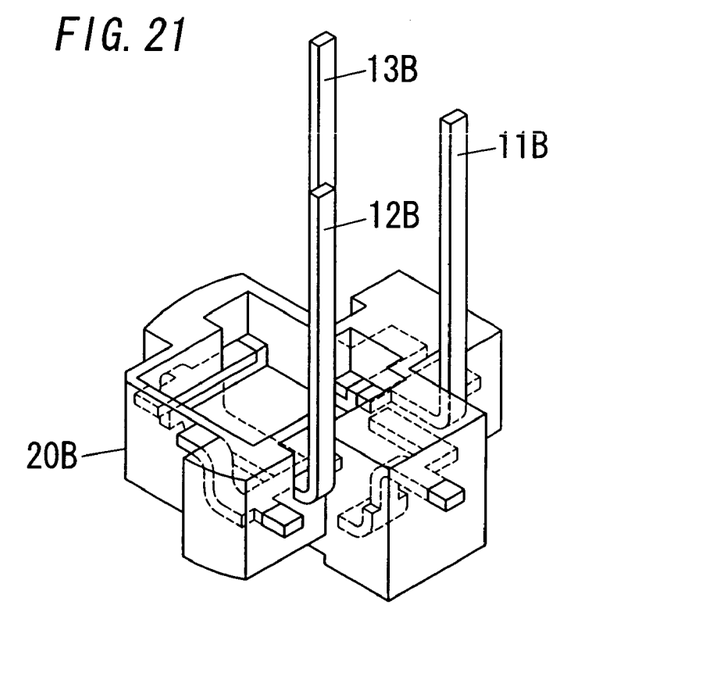

FIGS. 19 to 21 illustrate a modified sensor package which is identical to the above embodiment except that each of I/O pins 11B, 12B, and 13B are formed as an integral part of each corresponding one of the I/O conductors 71B, 72B, and 73B. Like parts are designated by like reference numerals with a suffix letter of "B", and no duplicate explanation is made here. The I/O pins are bent downward from the I/O conductors and extend through the holes in the base 10B.

The invention claimed is:

1. An infrared sensor package comprising:
   a dielectric support molded from a plastic material, said support being formed with a sensor mount for securing a pyroelectric element thereon and with an IC mount for securing an IC chip that processes a signal from said pyroelectric element,
   a base carrying said dielectric support, said base having a plurality of I/O pins extending therethrough for electrical connection of said IC chip with an external circuit,
   a cover secured to said base to provide a space therebetween for accommodating therein dielectric support,
   sensor conductors formed on the side of said support for electrical interconnection between said pyroelectric element and said IC chip,
   I/O conductors formed on the side of the said support for electrical interconnection between said IC chip and said I/O pins,
   said sensor conductors as well as said I/O conductors being embedded within with said dielectric support to be integral therewith,
   wherein said sensor package includes a first metal-shield and a second metal-shield which are embedded into said support in a spaced relation from each other adjacent to said IC mount for shielding said IC chip,
   said first metal-shield is electrically connected to a ground line of said IC said second metal-shield is electrically connected to a portion of said IC chip having an electrical potential higher than said ground line, and
   wherein said second metal-shield comprises a vertical segment embedded in said support behind said IC mount and a horizontal segment bent from the upper end of said vertical segment for shielding said IC chip from said pyroelectric element.

2. The infrared sensor package as set forth in claim 1, wherein said support is a generally cuboid having an upper face, front face adjacent to the upper face, and a lower face,
   said upper face being formed with said sensor mount,
   said front face being formed with said IC mount,
   each of said sensor conductor having portions exposed on the upper and front faces of said support respectively for connection with the pyroelectric element secured to the sensor mount as well as with the IC chip secured to the IC mount,
   each of said I/O conductors having portions exposed on the front and lower faces of said support respectively for connection with the IC chip and with said I/O pin on the lower face of the support.

3. The infrared sensor package as set forth in claim 1, wherein
   said support is a generally cuboid having an upper face formed with said sensor mount and a front face adjacent to said upper face, said front face being formed with said IC mount,
   said sensor conductor for connection with a signal output of said pyroelectric sensor being located adjacent to said upper face and being spaced diagonally with respect to said front face from the I/O conductor connected to a sensor output of said IC chip.

4. The infrared sensor package as set forth claim 1, wherein said support is a generally cuboid having an upper face formed with said sensor mount and a front face perpendicular to said upper face, said front face being formed with said IC mount, said I/O conductor including a vertical segment embedded within said support and a horizontal segment extending from the lower end of said vertical segment outwardly of said support for connection with said I/O pin.

5. The infrared sensor package as set forth in claim 1 wherein said sensor conductors are formed at their respective upper ends with pads that project on said support for electrical connection with electrodes of said pyroelectric element by means of electrically conductive adhesives.

6. The infrared sensor package as set forth in claim 1, wherein said support is formed with a concavity for receiving therein an external electric component to be connected to a circuit of said IC chip;

a pair of component terminals being molded into said support with portions thereof exposed to a bottom of said concavity for contact with said external electric component and for electrical interconnection of the external electric component to said IC chip.

* * * * *